United States Patent
Scarmalis

(12) 
(10) Patent No.: US 6,229,823 B1
(45) Date of Patent: May 8, 2001

(54) SYSTEM AND METHOD FOR THE COMPRESSION OF PROPRIETARY ENCAPSULATIONS

(75) Inventor: John Scarmalis, St. Petersburg, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 08/987,182

(22) Filed: Dec. 8, 1997

Related U.S. Application Data

(60) Provisional application No. 60/054,431, filed on Aug. 1, 1997.

(51) Int. Cl.[7] .................. H04J 3/18; H04J 3/24
(52) U.S. Cl. ........................... 370/477; 370/474
(58) Field of Search ............... 370/477, 474, 370/471, 473, 466, 401, 912, 469

(56) References Cited

U.S. PATENT DOCUMENTS

| | | | |
|---|---|---|---|
| 5,179,555 | * 1/1993 | Videlock et al. | 370/402 |
| 5,293,379 | * 3/1994 | Carr | 370/474 |
| 5,521,940 | * 5/1996 | Lane et al. | 375/240 |
| 5,774,467 | * 6/1998 | Herrera Van Der Nood et al. | 370/428 |
| 5,930,265 | * 7/1999 | Duault et al. | 370/473 |
| 5,974,052 | * 10/1999 | Johnson et al. | 370/467 |

* cited by examiner

*Primary Examiner*—David R. Vincent
(74) *Attorney, Agent, or Firm*—Thomas, Kayden, Horstemeyer & Risley, L.L.P.

(57) ABSTRACT

A system and method for the efficient compression and identification of nonstandard frame relay information packets allows the compression and transport of nonstandard frame relay packets over a frame relay network.

21 Claims, 7 Drawing Sheets

SYSTEM AND METHOD FOR THE COMPRESSION OF PROPRIETARY ENCAPSULATIONS

CROSS REFERENCE TO RELATED APPLICATION

This document claims priority to and the benefit of the filing date of copending and commonly assigned provisional application entitled A METHOD FOR THE COMPRESSION OF PROPRIETARY ENCAPSULATIONS, assigned Ser. No. 60/054,431, filed Aug. 1, 1997, and hereby incorporated by reference.

FIELD OF THE INVENTION

The present invention relates generally to data communications, and more particularly, to a system and method for compressing and transporting nonstandard frame relay packets over a communications network.

BACKGROUND OF THE INVENTION

In the field of data communications, a modem is used to convey information from one location to another. Digital Subscriber Line (DSL) technology now enables modems or other devices such as frame relay data service units (DSU's) to communicate large amounts of data. This communication scheme generally adheres to a model, known as the Open Systems Interconnect (OSI) Seven-Layer model. This model specifies the parameters and conditions under which information is formatted and transferred over a given communications network. A general background of the OSI seven-layer model follows.

In 1978, a framework of international standards for computer network architecture known as OSI (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols, which define the electrical and physical standards, perform the byte ordering of the data, and govern the transmission, and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC).

Layer 2, the datalink layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the datalink layer, and it is used by the transport is layer. An example of the network layer is Internet Protocol (IP) which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols.

Layer 4, the transport layer, determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression, and format and code conversion.

Layer 7, the application layer, is used by the presentation layer to provide the user with a localized representation of data which is independent of the format used on the network. The application layer is concerned with the user's view of the network and generally deals with resource allocation, network transparency and problem partitioning.

The communications networks that operate within the OSI seven-layer model include a number of paths or links that are interconnected to route voice, video, and/or digital data (hereinafter, collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a circuit-switching network. Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, then demultiplexed at the destination switching facility and finally delivered to the proper destination node. A variety of techniques for efficiently multiplexing data from multiple source nodes onto a single circuit of the network are presently employed in private line networks. For instance, time division multiplexing ("TDM") affords each source node full access to the allotted bandwidth of the circuit for a small amount of time. The circuit is divided into defined time segments, with each segment corresponding to a specific source node, to provide for the transfer of data from those source nodes, when called upon, through the network.

Other data communications systems, in contrast, have not been as successful with employing multiplexing techniques to enhance network efficiency further. In particular, frame-relay networks offer far fewer alternatives than their circuit-switching network counterparts. Frame-relay networks are often referred to as packet-switching networks. Packet-switching networks, as opposed to circuit-switching networks, allow multiple users to share data network facilities and bandwidth, rather than providing a specific amount of dedicated bandwidth to each user, as in TDM. Instead, packet switches divide bandwidth into connectionless, virtual circuits. As is known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit). Frame relay operates within layer 2 (the data link layer) of the OSI model, and is an improvement over previous packet switching techniques, such as X.25, in that frame relay requires significantly less overhead.

Standardized compression techniques have been employed to transport data across a frame relay network for the purpose of reducing the traffic load presented to the network, therefore increasing the amount of effective bandwidth available to a user.

Frame relay compressors transport data packets by compressing and then transporting the packets over the communications channel using standard protocols. The communications channel can be provided by, for example, an ISDN (Integrated Services Digital Network) connection, however, other physical connections may be employed to transport frame relay data. Typically, the frame relay data to be compressed and transported is packetized into standard High-Level Data Link Control-Unnumbered Information (HDLC-UI) Frame Relay packets in accordance with the Internet Engineering Task Force (IETF) Request for Comment (RFC) 1490. RFC 1490 defines the format of standard HDLC-UI frame relay packets. These standard packets are then compressed and transported over the frame relay network.

One problem with this system is that nonstandard frame relay packets, such as packets that do not conform completely to High-Level Data Link Control (HDLC) framing, cannot be compressed and transported through a frame relay network. Nonstandard packets are generated by various systems that use proprietary protocols for encapsulating the data to be transmitted. For example, router manufacturers frequently develop proprietary protocols that are used to encapsulate data packets with header and trailer information to ensure accurate transportation of data through their systems. However, the compression and transport of these proprietary encapsulations transparently through a frame relay network has been heretofore impractical using standard compression techniques.

SUMMARY OF THE INVENTION

The present invention provides an improvement to a frame relay communication environment by enabling the compression and transport, over a standard frame relay network, of nonstandard frame relay packets.

This task is accomplished by providing a system for efficiently compressing and transporting a nonstandard frame relay packet using logic configured to save a control byte of a nonstandard proprietary header associated with a packet payload. The payload packet contains the data to be transported within the frame relay network and can be any user data. The system contains logic designed to compress the packet payload, and insert, at a predetermined location, the saved control byte ahead of the compressed packet payload. The copied control byte itself is not compressed, but copied and inserted at the appropriate location ahead of the compressed payload in order to insure accurate routing of the payload. The system contains logic configured to transport the compressed payload over the network as is known in the art. Contained at a receiving device is logic configured to extract the saved control byte from the transported packet. The invention also contains logic designed to decompress the compressed payload packet and reinsert the control byte to its original location, ahead of the packet payload. The system can operate on any nonstandard proprietary header of any length.

The present invention also provides a method for the efficient transport of nonstandard frame relay data over a frame relay network. The invention provides a method for saving the control byte of a proprietary header associated with a packet payload and compressing the packet payload. The saved control byte is not compressed with the data. Next, the saved control byte is inserted, at a predetermined location, ahead of the compressed packet payload. The compressed packet payload is then transported over a communications network. Next, the saved control byte is extracted and the compressed packet payload is decompressed. Finally, the saved control byte is reinserted to its original location ahead of the packet payload.

The invention has numerous advantages, a few of which are delineated hereafter, as merely examples.

An advantage of the present invention is that it provides for a convenient method for transporting nonstandard frame relay data over a frame relay network.

Another advantage of the present invention is that it minimizes the amount of overhead required to transport nonstandard frame relay data.

Another advantage of the present invention is that it is simple in design, reliable in operation, and its design lends itself to economical mass production in modems.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each other, emphasis instead being placed on clearly illustrating the principles of the present invention.

DETAILED DESCRIPTION OF THE PREFERRED EMBODIMENT

The proprietary encapsulation logic of the present invention can be implemented in software, hardware, or a combination thereof. In the preferred embodiment, the proprietary encapsulation logic is implemented in software that is stored in a memory and that configures and drives a suitable digital signal processor (DSP) situated in a communications device. The preferred embodiment of the proprietary encapsulation transport logic of the invention is a software-based algorithm that is executed on a DSP. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method. Furthermore, the preferred embodiment of the encapsulation transport logic is illustrated in the context of a frame relay communications network, however, the concepts and principles of the encapsulation transport logic are equally applicable to other communication techniques where the transport of packetized information is provided for. Additionally, frame relay is typically accomplished over an integrated services digital network (ISDN) and will be discussed herein in that context.

Figure 1:
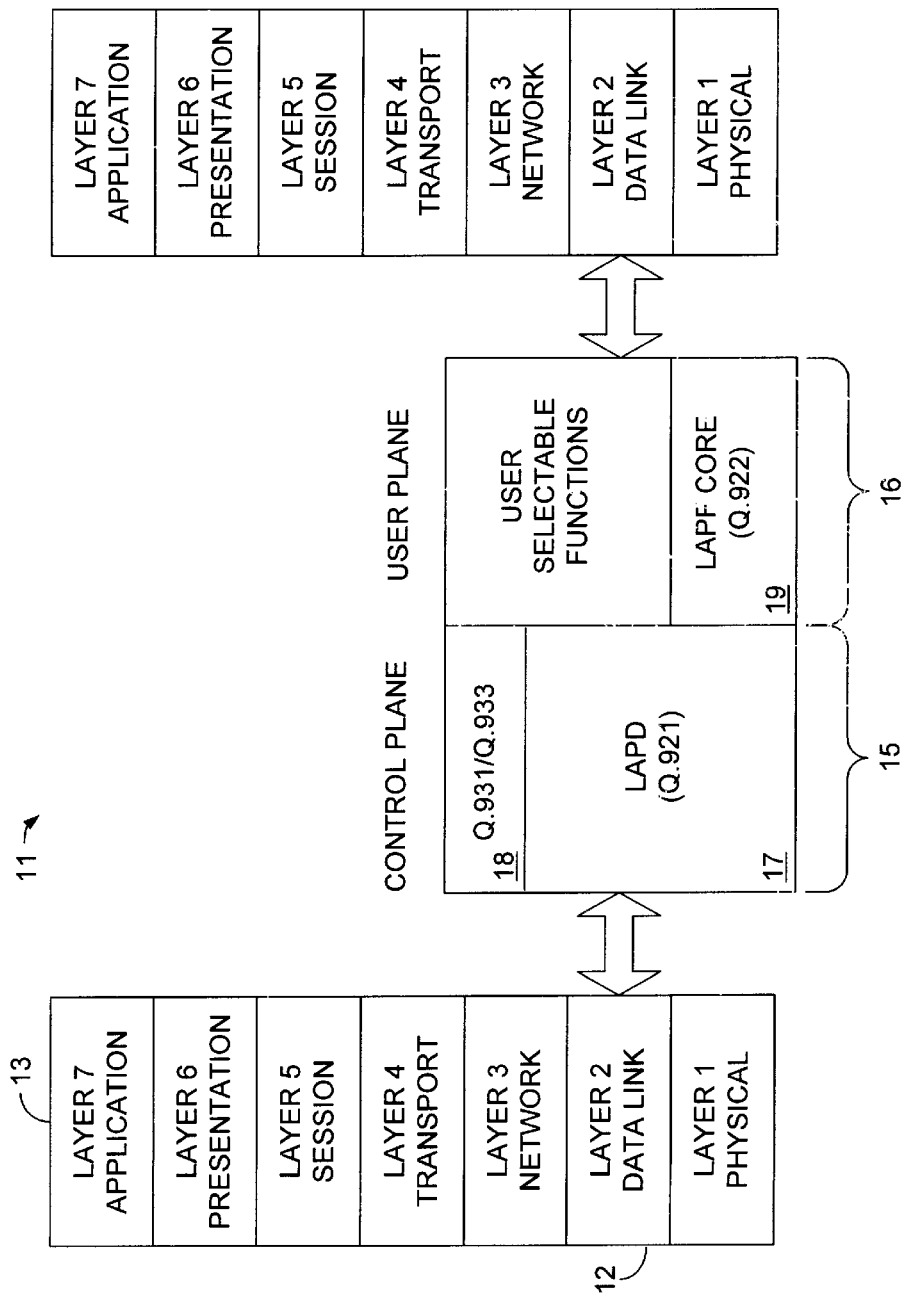
FIG. 1 is a block diagram of a network model illustrating the framework within which the present invention resides.

Referring now to FIG. 1, shown is a block diagram of a network model 11 illustrating the framework within which the present invention resides. The present invention substantially resides at layer 2, or the data link layer 12, of the OSI seven layer model 13. Contained at the data link layer 12 are the standards and protocols that enable the transport of frame relay data over an ISDN, or other communication connection. The protocol architecture that supports frame relay transport can be considered to reside in two planes of operation. The control plane 15 and the user plane 16. The control plane allows signaling to control the establishment and termination of transportation services on the user plane. At the data link layer 12, LAPD (Q.921) (Link Access Procedure on the D channel) 17 is used to provide a reliable data link control service with error control and flow control. This data link control service is used for the exchange of Q.931/Q.933 control signaling messages 18. For the transfer of information between end users, the user plane 16 protocol is LAPF (Q.922) (Link Access Procedure for Frame-Mode Bearer Services) 19. The protocol Q.922, among other things, includes an address header that is applied to a data packet and provides the addressing for the frame relay packet.

Figure 2:
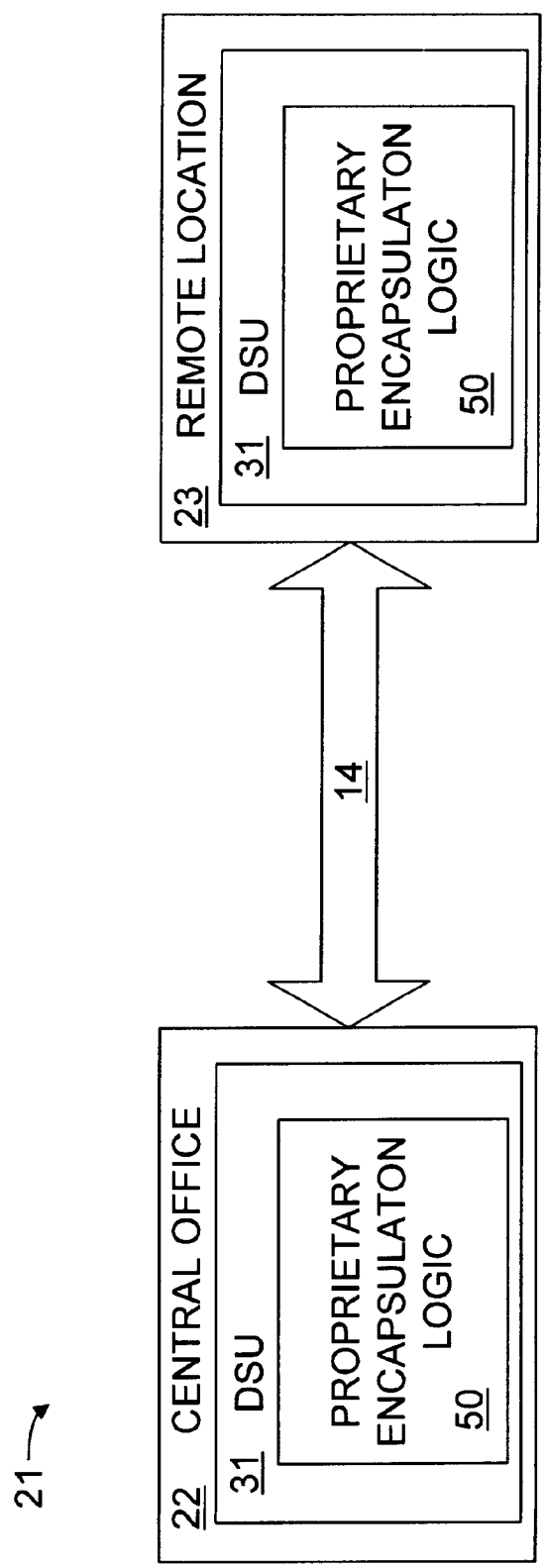
FIG. 2 is a schematic view illustrating a communications environment in which devices containing the proprietary encapsulation transport logic operate.

Referring now to FIG. 2, shown is a communications environment 21 in which communications devices containing the proprietary encapsulation transport logic of the present invention operate. Both central office location 22 and remote location 23 contain communication devices 31. Communications device 31 can be for example but not limited to, a data service unit (DSU), modem, or any other communication device capable of frame relay communication. In the preferred embodiment, communication device 31 is a DSU, which contains proprietary encapsulation transport logic 50. Central office location 22 is typically the local telephone companies' local exchange office, which connects via copper wire pair 14 to a remote customer location 23, which can be for example a residential or business location. While the preferred embodiment will discuss the proprietary encapsulation transport logic 50 as residing within a DSU, in fact any communications device may employ the proprietary encapsulation transport logic 50 to compress, identify, and transport nonstandard frame relay data over a frame relay network.

Figure 3:
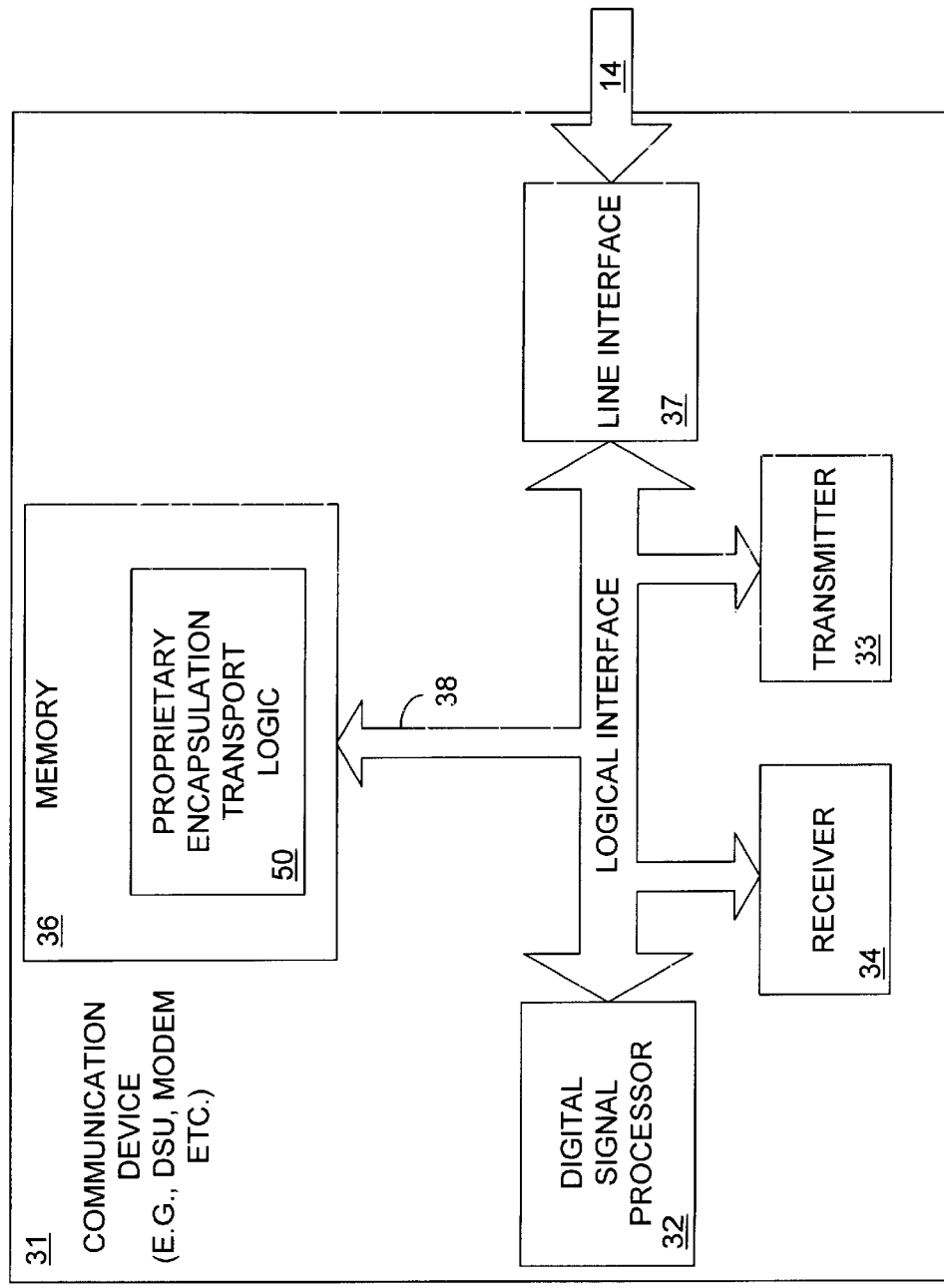
FIG. 3 is a schematic view illustrating a communications device containing the proprietary encapsulation transport logic of the present invention.

Referring now to FIG. 3, shown is a schematic view illustrating a communications device, for example but not limited to, a data service unit (DSU), containing the proprietary encapsulation transport logic 50. DSU 31 contains conventional components that are well known in the art of data communications. Digital signal processor (DSP) 32 is configured to control the operation of the DSU's transmitter 33 and receiver 34 through logical interface 38, and is configured to couple to line interface 37 to gain access to communication channel 14. Communication channel 14 is typically the copper wire pair that extends from a remote user location, such as a residence or business location, to a telephone company central office. However, communication channel 14 can be any medium for connecting the remote communication device, or DSU 31, to a central location. Also included in DSU 31 is memory 36, which includes the proprietary encapsulation transport logic 50 of the present invention. Proprietary encapsulation transport logic 50 is configured to enable and drive DSP 32 to allow the transport of nonstandard frame relay data packets over a frame relay communication network.

Figure 4:
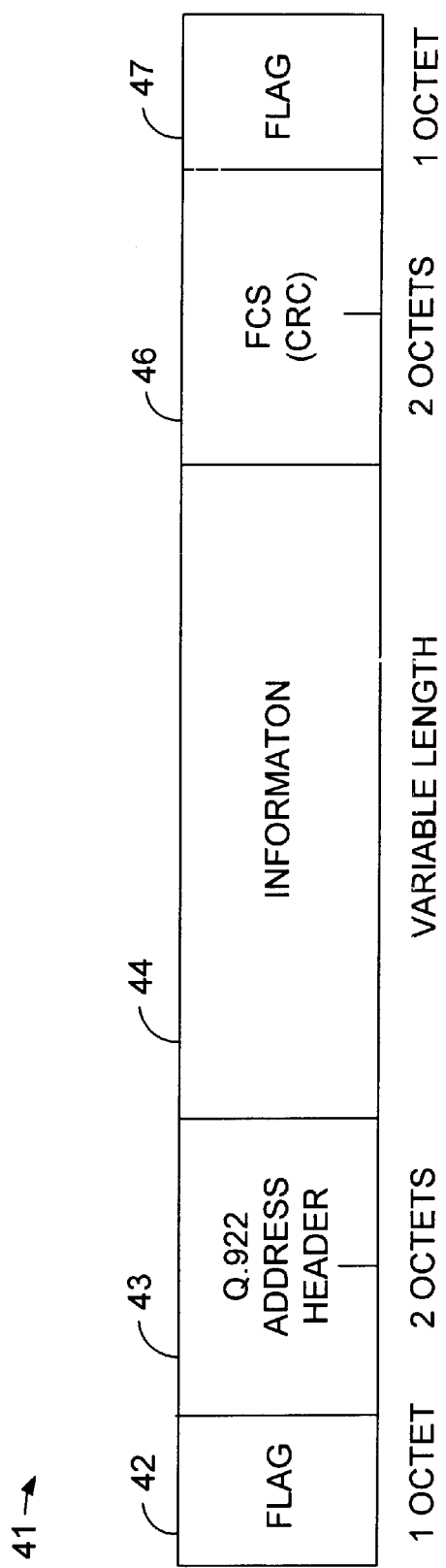
FIG. 4 is a schematic view illustrating a communications packet transported by the device of FIG. 3.

With reference now to FIG. 4, shown is a schematic view illustrating a communications packet 41 transported by the DSU of FIG. 3. Packet 41 is a standard frame relay communication packet. Begin flag 42 signals the start of the packet. Frame 43 is the Q.922 address header and is depicted as two octets. An octet is an eight bit word. Frame 43 can be a length of two to four octets, however, for simplicity is shown as two octets in this preferred embodiment. Following frame 43 is information frame 44 which contains the user data to be transported over the network, and any proprietary header information required. Information frame 44 is variable in length depending upon the information to be transported. Following information frame 44 is frame check sequence (FCS) frame 46. The FCS frame is typically two octets in length and is typically a cyclical redundancy check (CRC) error detection code used to ensure the integrity of the transported information. Finally, frame 47 contains the one octet end flag used to signal the end of the packet.

Figure 5:
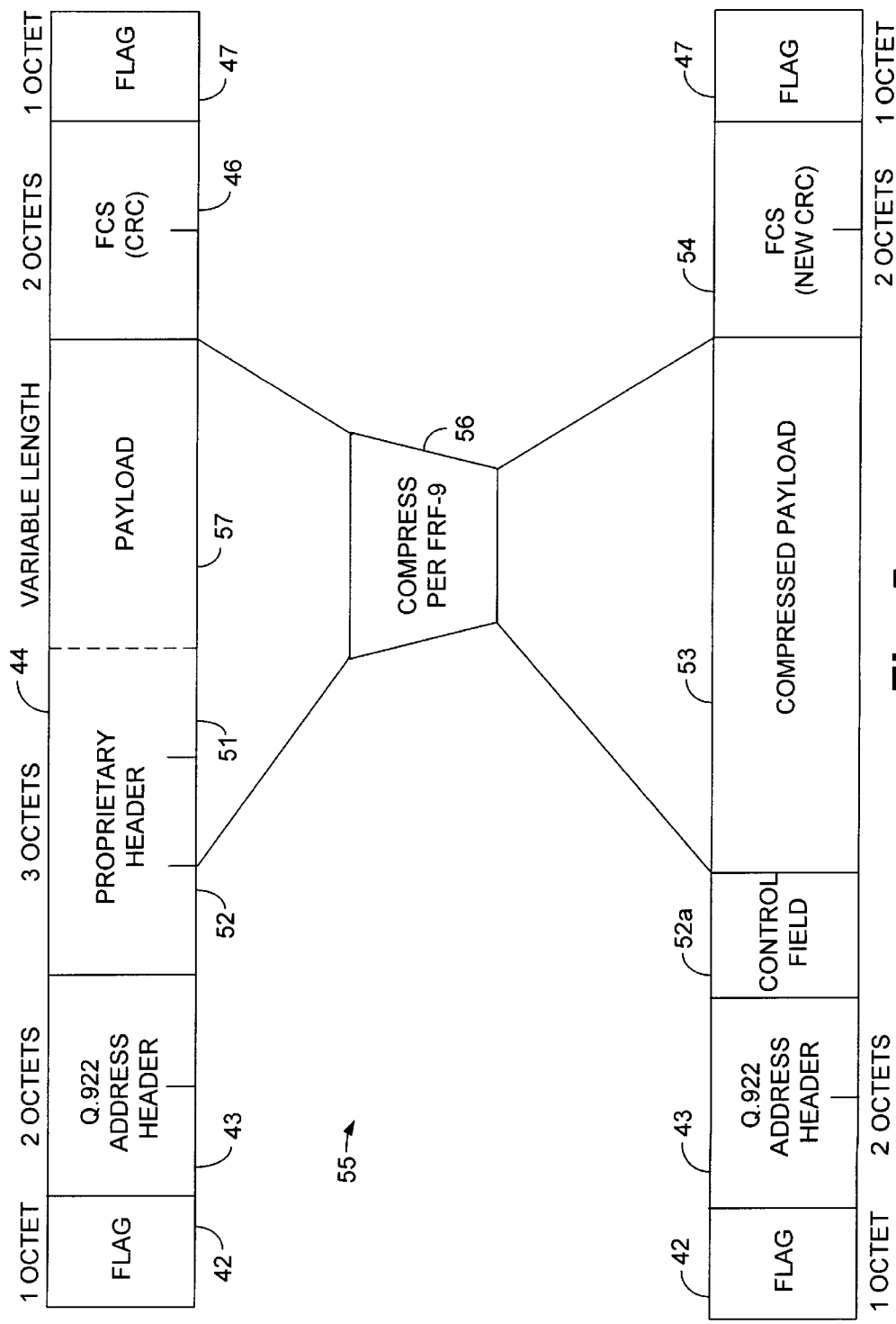
FIG. 5 is a schematic view illustrating a nonstandard communication packet as transported by the proprietary encapsulation transport logic of FIG. 3.

Referring now to FIG. 5, shown is a schematic view illustrating a nonstandard communications packet 55 as transported by the proprietary encapsulation transport logic 50 of the present invention. Flag header 42 is followed by Q.922 address header 43. Proprietary header 51 is a segment of information frame 44. Proprietary header 51 can be for example, a header applied by a nonstandard protocol to enable routing according to a proprietary scheme. The existence of proprietary header 51 makes communication packet 55 a "nonstandard" packet, thus preventing the transport of the packet by a standard frame relay protocol. Proprietary header 51 can be any number of octets, however it is depicted in the preferred embodiment as being three octets in length. Control field 52 is the first octet in proprietary header 51 and is in the position which would be occupied by an Unnumbered Information (UI) control field as defined in IETF RFC-1490. The compression and transport of standard frame relay traffic is defined in Frame Relay Forum-9 (FRF-9). FRF-9 is the data compression over frame relay implementation agreement, as published by the frame relay forum technical committee on Jan. 22, 1996 and is known in the art. FRF-9 defines the compression and transport of standard IETF frames with a UI control field in the position occupied by a proprietary octet in control field 52. The presence of a proprietary octet in control field 52 represents a deviation from FRF-9. Control field 52 is saved and copied in accordance with the principles of the proprietary encapsulation transport logic into position 52a of the packet to be transported. After control field 52 is saved, the balance of proprietary header 51 and payload frame 57 are compressed 56 in accordance with FRF-9. Once compressed, a new FCS cyclic redundancy check (CRC) frame 54 is generated for compressed payload frame 53 and applied as a trailer. Control field 52 that has been saved and copied is now inserted ahead of compressed payload frame 53 and behind Q.922 address header 43 at location 52a, thus preserving compatibility with the frame relay network. The packet is now ready to be transported over a frame relay communications path.

Figure 6:
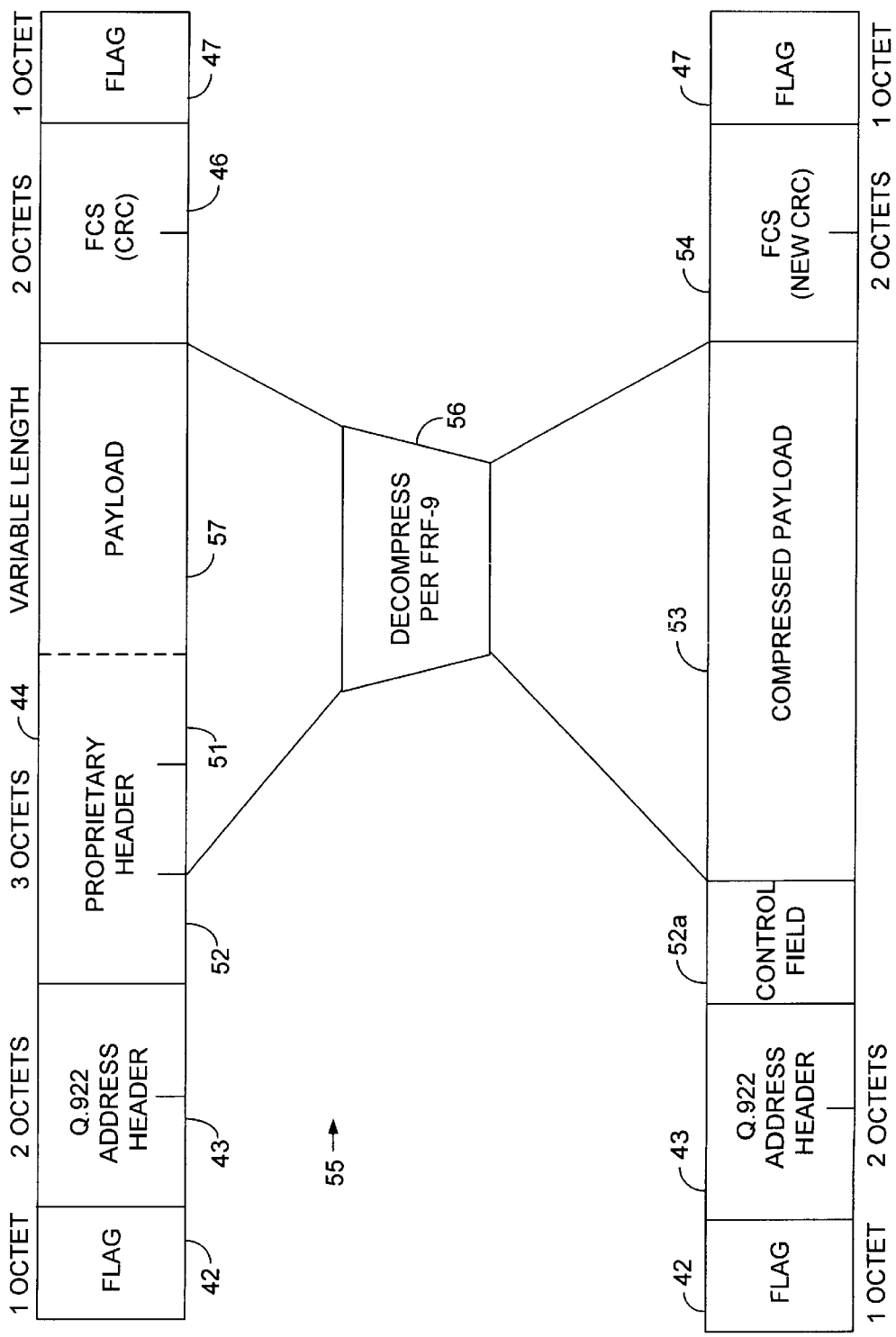
FIG. 6, is a schematic view illustrating a received nonstandard communication packet as transported by the proprietary encapsulation transport logic of FIG. 3.

Referring now to FIG. 6, shown is a schematic view illustrating a received communication packet in accordance with the proprietary encapsulation transport logic. At a receiver, the control field 52a is extracted from the received packet. Compressed payload frame 53 is decompressed 56 in accordance with FRF-9. Control field 52 is now reinserted ahead of payload frame 57 and behind Q.922 address header 43, into its original location for presentation.

Figure 7:
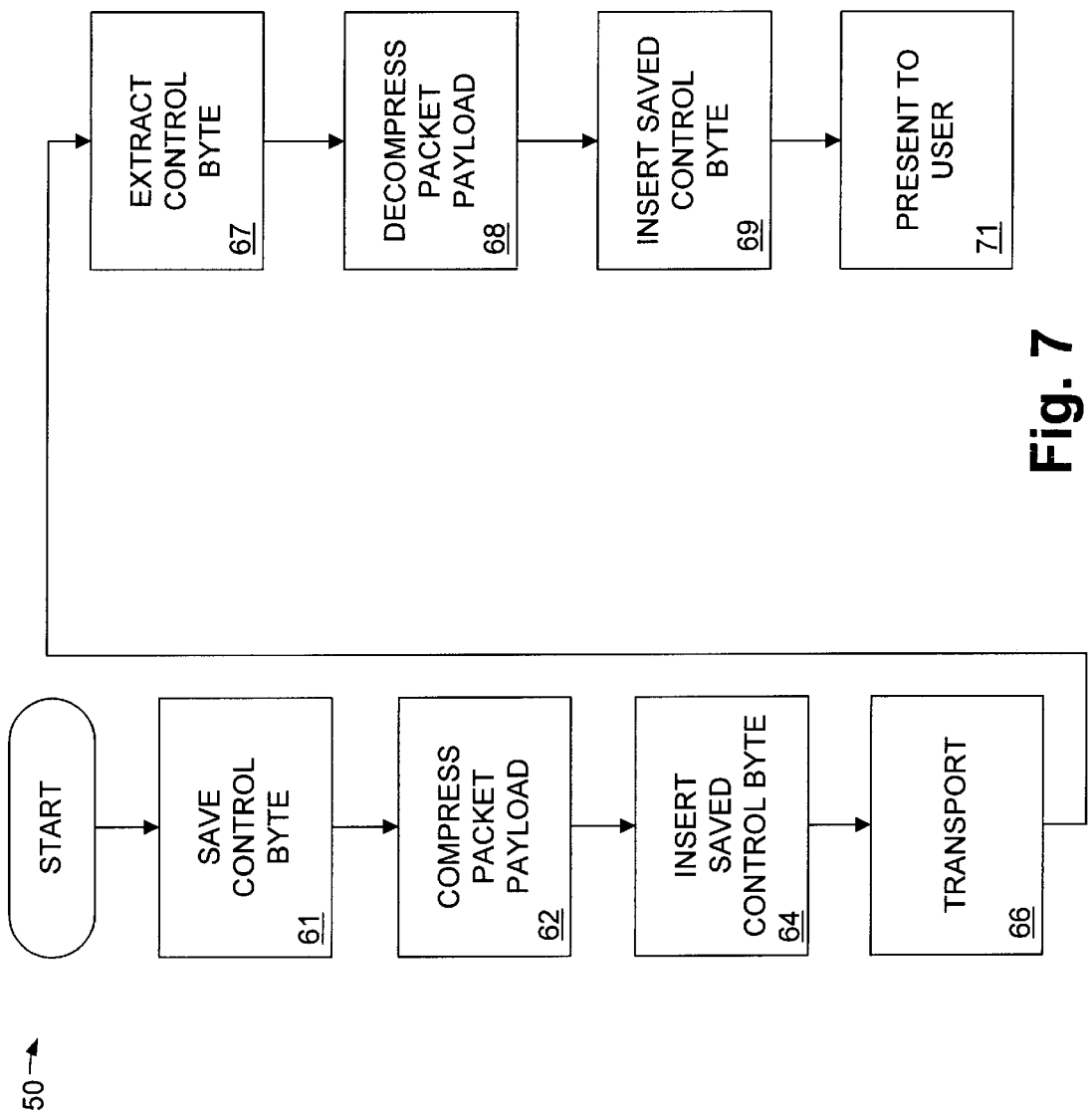
FIG. 7 is a flowchart illustrating the architecture, functionality, and operation of the proprietary encapsulation transport logic of FIG. 3.

Referring now to FIG. 7, shown by way of flowchart is the proprietary encapsulation transport logic 50 (FIG. 3) of the present invention. In block 61 the control byte, or control field 52 of FIG. 5, is saved and copied. Control field 52 is the first octet in proprietary header 51 of FIG. 5. In block 62, the balance of the packet payload is compressed in accordance with FRF-9. Note that the saved control byte is not compressed with the packet payload. In block 64, saved control byte 52 is inserted ahead of the compressed payload and behind the Q.922 address header at location 52a of FIG. 5. The packet is now transported in block 66 over the frame relay network. In block 67 the control byte is extracted from the received packet. In block 68 the compressed payload packet is decompressed in accordance with FRF-9. In block 69 the saved control byte is reinserted into its original location ahead of the payload frame and behind the Q.922 address header in position 52 of FIG. 6, and in block 71 is ready for presentation to the user.

It will be obvious to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

Therefore, the following is claimed:

1. A system for efficiently compressing and transporting a nonstandard communications packet, comprising:
    means for saving a control byte of a proprietary header associated with a packet payload, wherein said proprietary header is any header applied by a nonstandard communication protocol;
    means for compressing said packet payload;
    means for inserting, at a predetermined location, said saved control byte ahead of said compressed packet payload;
    means for transporting said compressed packet payload over a communications network;
    means for extracting said saved control byte;
    means for decompressing said compressed packet payload to create a decompressed packet payload; and
    means for inserting said saved control byte, at its original location ahead of said decompressed packet payload.

2. The system of claim 1, wherein said means for compressing said packet payload further comprises:
    means for compressing said packet payload independent of said saved control byte.

3. The system of claim 1, wherein said proprietary header can be any number of octets in length.

4. A system for efficiently compressing and transporting a nonstandard frame relay packet, comprising:
    logic configured to save a control byte of a proprietary header associated with a packet payload, wherein said proprietary header is any header applied by a nonstandard communication protocol;
    logic configured to compress said packet payload;
    logic configured to insert at a predetermined location, said saved control byte ahead of said compressed packet payload;
    logic configured to transport said compressed packet payload over a communications network;
    logic configured to extract said saved control byte;
    logic configured to decompress said compressed packet payload to create a decompressed packet payload; and
    logic configured to insert said saved control byte, at its original location ahead of said decompressed packet payload.

5. The system of claim 4, wherein said logic configured to compress said packet payload further comprises:
    logic configured to compress said packet payload independent of said saved control byte.

6. The system of claim 4, wherein said proprietary header can be any number of octets in length.

7. A method for efficiently compressing and transporting a nonstandard fame relay packet, comprising the steps of:
    saving a control byte of a proprietary header associated with a packet payload, wherein said proprietary header is any header applied by a nonstandard communication protocol;
    compressing said packet payload;
    inserting, at a predetermined location, said saved control byte ahead of said compressed packet payload;
    transporting said compressed packet payload over a communications network;
    extracting said saved control byte;
    decompressing said compressed packet payload to create a decompressed packet payload; and
    inserting said saved control byte, at its original location ahead of said decompressed packet payload.

8. The method of claim 7, wherein said step of compressing said packet payload further comprises the step of:
    compressing said packet payload independent of said saved control byte.

9. The method of claim 7, wherein said proprietary header can be any number of octets in length.

10. A system for efficiently compressing and transporting a nonstandard communications packet, comprising:
    means for saving a control byte of a proprietary header associated with a packet payload, wherein said proprietary header is any header applied by a nonstandard communication protocol;
    means for compressing said packet payload;
    means for inserting, at a predetermined location, said saved control byte ahead of said compressed packet payload; and
    means for transporting said compressed packet payload over a communications network.

11. The system of claim 10, wherein said means for compressing said packet payload further comprises:
    means for compressing said packet payload independent of said saved control byte.

12. The system of claim 10, wherein said proprietary header can be any number of octets in length.

13. A system for efficiently compressing and transporting a nonstandard communications packet, comprising:

logic configured to save a control byte of a proprietary header associated with a packet payload, wherein said proprietary header is any header applied by a nonstandard communication protocol;

logic configured to compress said packet payload;

logic configured to insert, at a predetermined location, said saved control byte ahead of said compressed packet payload; and logic configured to transport said compressed packet payload over a communications network.

14. The system of claim 13, wherein said logic configured to compress said packet payload further comprises:

logic configured to compress said packet payload independent of said saved control byte.

15. The system of claim 13, wherein said proprietary header can be any number of octets in length.

16. A method for efficiently compressing and transporting a nonstandard communications packet, comprising the steps of:

saving a control byte of a proprietary header associated with a packet payload, wherein said proprietary header is any header applied by a nonstandard communication protocol;

compressing said packet payload;

inserting, at a predetermined location, said saved control byte ahead of said compressed packet payload; and transporting said compressed packet payload over a communications network.

17. The method of claim 16, wherein said step of compressing said packet payload further comprises the step of:

compressing said packet payload independent of said saved control byte.

18. The method of claim 16, wherein said proprietary header can be any number of octets in length.

19. A computer readable medium having a program for efficiently compressing and transporting a nonstandard communications packet, the program comprising:

logic configured to save a control byte of a proprietary header associated with a packet payload, wherein said proprietary header is any header applied by a nonstandard communication protocol;

logic configured to compress said packet payload;

logic configured to insert, at a predetermined location, said saved control byte ahead of said compressed packet payload; and logic configured to transport said compressed packet payload over a communications network.

20. The program of claim 19, wherein said logic configured to compress said packet payload further comprises:

logic configured to compress said packet payload independent of said saved control byte.

21. The program of claim 19, wherein said proprietary header can be any number of octets in length.

* * * * *